United States Patent
Li et al.

(10) Patent No.: US 8,125,856 B1
(45) Date of Patent: Feb. 28, 2012

(54) METHOD AND SYSTEM FOR OPTICALLY COUPLING A LASER WITH A TRANSDUCER IN AN ENERGY ASSISTED MAGNETIC RECORDING DISK DRIVE

(75) Inventors: Ruolin Li, Milpitas, CA (US); Ut Tran, San Jose, CA (US); Yufeng Hu, Fremont, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 64 days.

(21) Appl. No.: 12/613,452

(22) Filed: Nov. 5, 2009

(51) Int. Cl.
  *G11B 11/00* (2006.01)
(52) U.S. Cl. .................................... 369/13.01
(58) Field of Classification Search .......................... None
  See application file for complete search history.

(56) References Cited

U.S. PATENT DOCUMENTS

| | | | |
|---|---|---|---|
| 7,483,229 B2 | 1/2009 | Rausch et al. | |
| 2005/0190682 A1 | 9/2005 | Gage et al. | |
| 2006/0233061 A1* | 10/2006 | Rausch et al. | 369/13.32 |
| 2006/0233062 A1 | 10/2006 | Bedillion et al. | |
| 2007/0183730 A1* | 8/2007 | Morimoto et al. | 385/129 |
| 2008/0056073 A1* | 3/2008 | Shimizu | 369/13.02 |
| 2008/0123219 A1 | 5/2008 | Gomez et al. | |
| 2008/0181560 A1 | 7/2008 | Suh et al. | |
| 2008/0232225 A1 | 9/2008 | Cho et al. | |
| 2009/0106783 A1* | 4/2009 | Miyanishi et al. | 720/658 |
| 2010/0226656 A1* | 9/2010 | Niitsu et al. | 398/139 |
| 2011/0026377 A1* | 2/2011 | Shimazawa et al. | 369/13.24 |
| 2011/0058273 A1* | 3/2011 | Sasaki et al. | 360/59 |

* cited by examiner

*Primary Examiner* — Joseph Haley
*Assistant Examiner* — Henok Heyi

(57) ABSTRACT

A method and system for providing an energy assisted magnetic recording (EAMR) disk drive are described. A media for storing data and a slider are provided. The slider has a back side, a trailing face, and an air-bearing surface (ABS) opposite to the back side. At least one laser is coupled with the trailing face of the slider, and has an optic axis substantially parallel to the trailing face. The laser(s) provide energy substantially along the optic axis. Optics are coupled with the trailing face of the slider and receive the energy from the laser(s) via free space. At least one EAMR transducer coupled with the slider. At least part of the EAMR transducer resides in proximity to the ABS. The optics direct the energy from the laser(s) to the EAMR transducer(s). The EAMR transducer(s) receive the energy from the optics and write to the media using the energy.

24 Claims, 5 Drawing Sheets

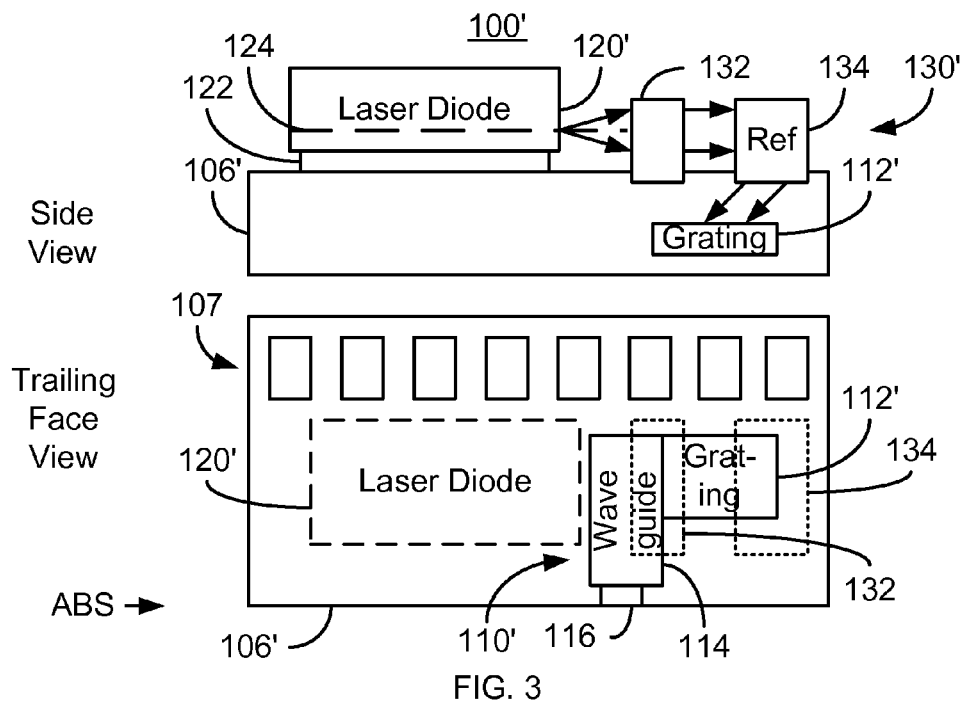
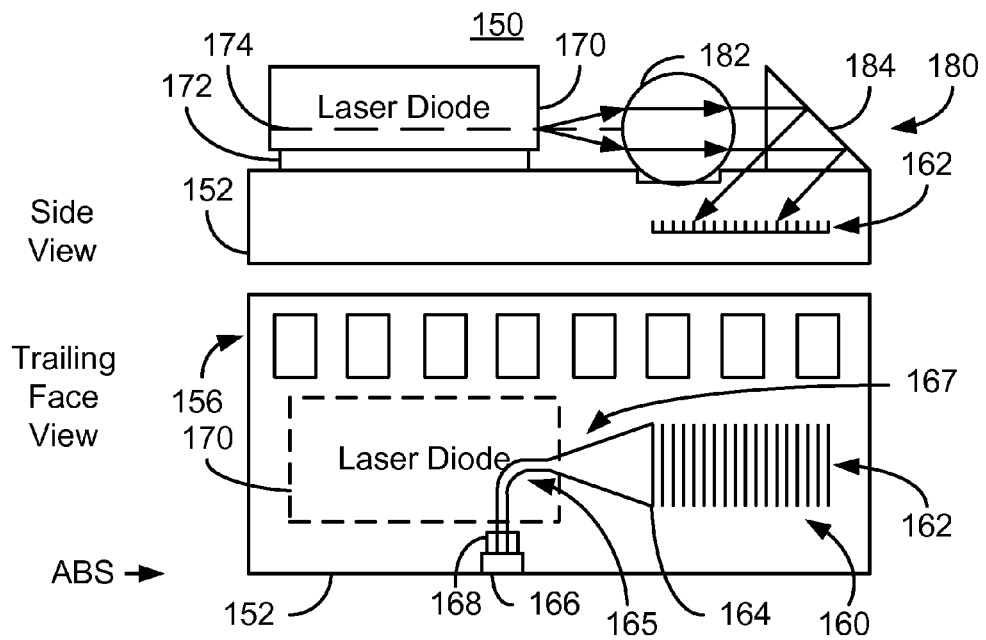

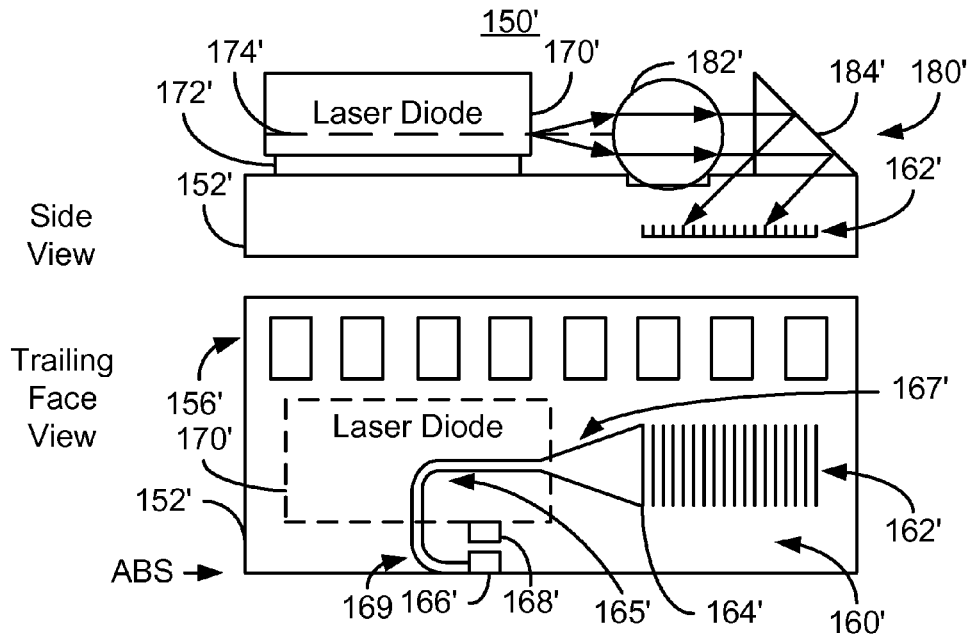
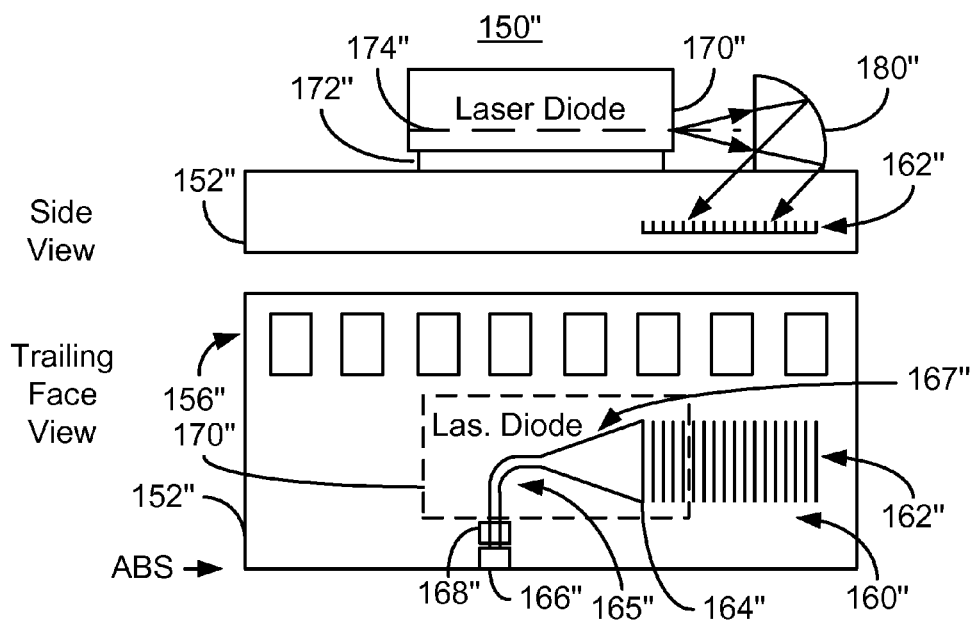

METHOD AND SYSTEM FOR OPTICALLY COUPLING A LASER WITH A TRANSDUCER IN AN ENERGY ASSISTED MAGNETIC RECORDING DISK DRIVE

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). Other components that may be part of the conventional EAMR disk drive 10 are not shown. The conventional slider 20 includes a back side 24 and a trailing face 26. The conventional slider 20 is typically attached to the suspension at its back side 24. A conventional EAMR transducer 22 is coupled with the slider 20 on the trailing face 26 of the slider.

The conventional EAMR transducer 22 includes a grating (not separately shown) on the trailing face 26. Light from the conventional laser diode 30 is provided substantially along the optic axis 32 of the conventional laser diode 30 to the grating of conventional EAMR transducer 22. In some conventional EAMR disk drives, an optical fiber or other medium is utilized to provide the light from the laser 30 to the grating. In order for the light to be coupled into the grating and back reflections reduced, the light is desired to be delivered at a particular angle to the grating. As a result, light from the laser diode 30 is coupled into the grating of the conventional transducer.

In operation, the laser diode 30 provides light substantially along the optic axis 32 to the grating. The light from the laser diode 30 is coupled into the grating with reduced back reflections, and then provided to a waveguide of the conventional transducer 22. The waveguide directs the light toward the conventional media 12, heating a small region of the conventional media 12. The conventional EAMR transducer 22 magnetically writes to the conventional media 12 in the region the conventional media 12 is heated.

Although the conventional EAMR transducer 10 may function, manufacturing the conventional EAMR transducer 10 at an acceptable cost and efficiency of light delivery may be challenging. The conventional laser diode 30 and conventional slider 20 may be placed and mounted to the suspension using a conventional pick and place system. As discussed above, the conventional laser diode 30 and conventional slider 20 are to be placed such that the optic axis 32 makes a specific angle with normal to the trailing face 26. Accurately placing the conventional slider 20 and conventional laser diode 30 using such a conventional system may result in misalignments. Such misalignments may increase insertion loss of the laser light. Thus, efficiency of light delivery may suffer. Similarly, use of a fiber optic cable to couple light from the laser 30 to the transducer 22 may be mechanically unstable and increase the cost of the conventional EAMR transducer 10. In addition, manufacturing yield and/or manufacturing time may suffer.

Accordingly, what is needed is a system and method for improving manufacturability of an EAMR transducer.

BRIEF SUMMARY OF THE INVENTION

A method and system for providing an energy assisted magnetic recording (EAMR) disk drive are described. The method and system include providing a media for storing data and a slider. The slider has a back side, a trailing face, and an air-bearing surface (ABS) opposite the back side. The method and system further include providing at least one laser and optics. The laser(s) are coupled with the trailing face of the slider. Each of the laser(s) has an optic axis substantially parallel to the trailing face of the slider. The laser(s) provide energy substantially along the optic axis. The optics are coupled with the trailing face of the slider and receive the energy from the laser(s) via free space. The method and system also include providing at least one EAMR transducer coupled with the slider. At least a portion of the transducer resides in proximity to the ABS. The optics direct the energy from the laser(s) to the EAMR transducer(s). The EAMR transducer(s) receives the energy from the optics and writes to the media using the energy.

BRIEF DESCRIPTION OF SEVERAL VIEWS OF THE DRAWINGS

FIG. 3 depicts a trailing face and side views of an exemplary embodiment of a portion of an EAMR disk drive.

FIG. 4 depicts a trailing face and side views of another exemplary embodiment of a portion of an EAMR disk drive.

FIG. 5 depicts a trailing face and side views of another exemplary embodiment of a portion of an EAMR disk drive.

FIG. 6 depicts a trailing face and side views of another exemplary embodiment of a portion of an EAMR disk drive.

DETAILED DESCRIPTION OF THE PREFERRED EMBODIMENTS

Figure 1:
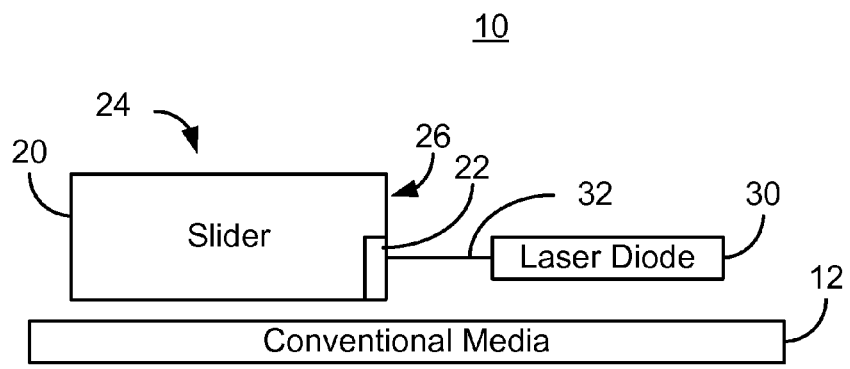
FIG. 1 depicts a side view of a conventional EAMR disk drive.
Figure 2:
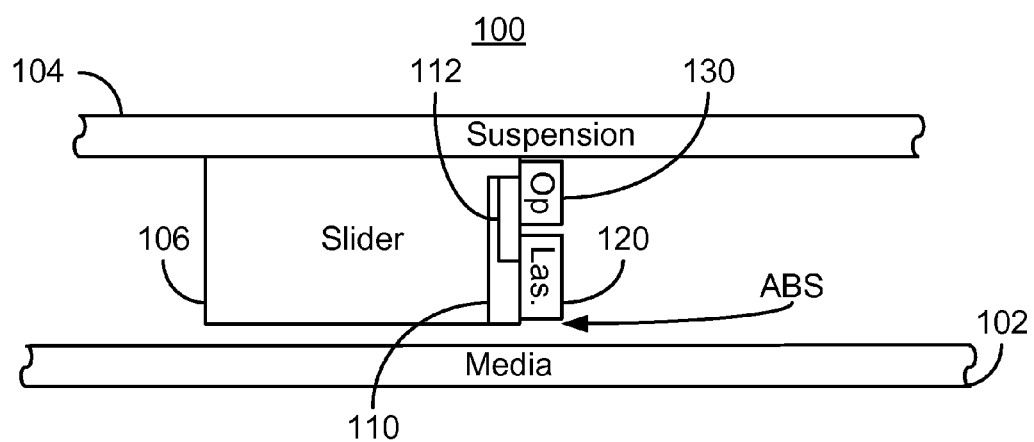
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes media 102, suspension 104, a slider 106, an EAMR transducer 110 having one or more gratings 112, laser(s) 120, and optics 130. In some embodiments, the laser 120 is a laser diode. The EAMR transducer 110 is coupled with the laser 120. In one embodiment, the EAMR transducer 110 is optically coupled to the laser 120 through the grating 112. Although described as coupled to the slider 106, the EAMR transducer 110 may be considered to be fabricated as part of the slider 106.

The laser 120 and optics 130 are coupled with the trailing face of the slider 106. Energy, typically in the form of light in the optical range of the spectrum, is emitted from the laser 120. The energy travels generally along the optic axis (not shown in FIG. 2) of the laser 120. This optic axis is generally parallel to the trailing face of the slider 106. However, there is generally at least some divergence in the beam of energy from the laser 120. The energy may reach the optics 130 from the laser 120 via free space. The optics 130 redirects the energy from the laser 120 to the EAMR transducer 110. In some embodiments, the optics 130 both collimates and redirects the energy toward the EAMR transducer 110. Thus, the energy from the laser 120 is coupled to the grating 112 via optics 130.

In addition to the grating(s) 112, the EAMR transducer 110 includes at least one waveguide (not explicitly shown in FIG. 2), at least one write pole (not explicitly shown in FIG. 2), and at least one coil (not explicitly shown in FIG. 2). The EAMR transducer 110 also has an air-bearing surface (ABS) configured to reside in proximity to a media 102 during use. The waveguide(s) are for directing the energy from the laser 104 toward the ABS. In the embodiment shown, the energy from the laser 104 is thus coupled into the transducer 110, and thus the waveguide(s), by the grating(s) 112.

In operation, light from the laser 120 is provided to the optics 130, then to the grating 112. The grating 112 is optically coupled with a waveguide (not shown). In addition, a near-field transducer (NFT) may also be used to further focus the energy from the waveguide onto a small spot on the media 102. The waveguide directs the energy from the grating 112 to the NFT and/or the ABS. Thus, a small region of the media 102 is heated. The EAMR transducer 110 may write data to the media while the media is heated.

The EAMR disk drive 100 may have improved optical efficiency. The optics 130 may be used to effectively redirect energy from the laser 120 to the EAMR transducer 110. As a result, performance of the EAMR disk drive 100 may be enhanced. Further, the optics 130 may be relatively low cost, as described below. Coupling of the laser 120 and optics 130 to the slider may also be accomplished via wafer level bonding. Consequently, alignment accuracy and manufacturing yield may be improved. In addition, various configurations of waveguides (not shown in FIG. 2) may be used to improve the adaptability of the configuration shown in FIG. 2. Thus, performance and manufacturing of the EAMR disk drive 100 may be enhanced.

FIG. 3 depicts an exemplary embodiment of a portion of another EAMR disk drive 100'. In particular, trailing face and side views of the slider and some components coupled to the slider are shown. For clarity, FIG. 3 is not to scale. For simplicity not all portions of the EAMR disk drive 100' are shown. In addition, although the disk drive 100' is depicted in the context of particular components other and/or different components may be used. Further, the arrangement of components may vary in different embodiments. The EAMR disk drive 100' is analogous to the EAMR disk drive 100 depicted in FIG. 2. The EAMR disk drive 100' thus includes media (not shown), suspension (not shown), a slider 106', an EAMR transducer 110' having one or more gratings 112', laser 120', and optics 130'. In the trailing face view, the laser diode 120 and components 132 and 134 of the optics 130' are shown by dashed and dotted lines, respectively. Thus, the EAMR disk drive 100' shown in FIG. 3 may be used in the EAMR disk drive 100 shown in FIG. 2. The EAMR transducer 110', as well as the slider 106', has an ABS configured to reside in proximity to the media during use of the transducer 110'. Although described as coupled to the slider 106', the EAMR transducer 110' may be considered to be fabricated as part of the slider 106'.

The laser diode 120' has optic axis 124 depicted with a dashed line. The laser diode 120' is coupled to the trailing face of the slider 106' through bond pads 122. As can be seen in FIG. 3, although energy from the laser 120 travels generally along the optic axis 124, the beam, shown by arrows, does diverge. Thus, the optics 130 includes a collimator 132 and reflector 134. The reflector 134 directs energy from the collimator 132 to the grating 112' of the EAMR transducer 110'. In another embodiment, the collimation and reflection functions of the optics 130' may be combined into a single component or split between another number of components.

The EAMR transducer 110' includes grating(s) 112' and waveguide 114. In the embodiment shown, the EAMR transducer 110' also includes a near-field transducer (NFT) 116. However, in alternate embodiments, the NFT 116 may be omitted. The waveguide 114 directs energy from the grating(s) 112' toward the ABS. The waveguide 114 may have various configurations, described below, to facilitate use of the NFT 116 and coupling of the energy to the media 102. For example, the waveguide 114 may be tapered to focus the energy to a smaller spot size and provide the desired polarization at the appropriate location.

The EAMR disk drive 100' functions in a manner analogous to the EAMR disk drive 100. Thus, the EAMR disk drive 100' shares the benefits of the EAMR disk drive 100. For example, the EAMR disk drive 100' may have improved optical efficiency. Even though the beam from the laser 120' is divergent, the collimator 132 allows for an improvement in coupling of the energy from the laser 120' to the grating 112'. Use of a grating 112' having a coupling direction oriented parallel to the ABS may also improve optical coupling. Further, the components 120', 132, and 134 may be coupled to the slider 106' using wafer level processes. Consequently, alignment accuracy and manufacturing yield may be improved. In addition, various configurations of waveguides 114 may be used to improve the adaptability of the configuration shown in FIG. 3. Thus, performance and manufacturing of the EAMR disk drive 100' may be improved.

FIG. 4 depicts an exemplary embodiment of a portion of an EAMR disk drive 150. In particular, trailing face and side views of the slider and some components coupled to the slider are shown. For clarity, FIG. 4 is not to scale. For simplicity not all portions of the EAMR disk drive 150 are shown. In addition, although the disk drive 150 is depicted in the context of particular components other and/or different components may be used. Further, the arrangement of components may vary in different embodiments. The EAMR disk drive 150 is analogous to the EAMR disk drives 100 and 100'. The EAMR disk drive 150 thus includes media (not shown), suspension (not shown), a slider 152, bond pads 156, an EAMR transducer 160, laser 170, and optics 180. In the trailing face view, the laser diode 170 is shown by dashed lines. For simplicity, the optics 180 are not shown in the trailing face view. Thus, the EAMR disk drive 150 shown in FIG. 4 may be used in the EAMR disk drive 100 shown in FIGS. 2 and 3. The slider 152, EAMR transducer 160, laser 170, and optics 180 may thus be considered to correspond to the slider 106/106', EAMR transducer 110/110', laser 120/120', and optics 130/130'. The EAMR transducer 160, as well as the slider 152, has an ABS configured to reside in proximity to the media during use of the transducer 160. Although described as coupled to the slider 152, the EAMR transducer 160 may be considered to be fabricated as part of the slider 152.

The laser diode 170 has optic axis 174 depicted with a dashed line and is coupled to the trailing face of the slider 152 through bond pads 172. The laser diode 170 emits light at its edge, generally along the optic axis 174. However, the beam of energy from the laser 170, shown by arrows, has some divergence. In the embodiment shown, the laser 170 emits light to free space. Thus, the laser is optically coupled to the optics 180 via free space.

The optics 180 includes a lens 182 that collimates the light from the laser 170. In the embodiment shown, the lens 182 is a micro-ball lens. For example, the ball lens 182 may have a diameter of less than one hundred microns. In some embodiments, the diameter of the all lens 182 is less than fifty microns. In an alternate embodiment, the lens 182 may be a cylindrical lens. The EAMR disk drive 150 is described in the context of a ball lens 182. The ball lens 182 may also be bonded to the trailing face of the slider 152. In the embodiment shown, the ball lens 182 resides in a recess in the trailing face of the slider 152. For example, the recess may be etched at a depth and size such that the ball lens 182 may be dropped in. The recess may also be sized and placed such that the appropriate vertical and focal alignment between the lens ball 182 and prism 184 is attained.

From the ball lens 182, the energy from the laser 170 travels to the prism 184 that acts as a reflector. The prism 184 shown is a micro-prism having a reflective coating on its back surface. Thus, the energy reflects off of the back surface of the prism 184. The prism redirects energy from the ball lens 182 toward the EAMR transducer 160. More specifically, energy is directed to the grating 162 of the EAMR transducer 160. In another embodiment, the collimation and reflection functions of the ball lens 182 and prism 184 may be performed using alternate and/or additional components.

The EAMR transducer 160 includes grating(s) 162, waveguide 164, NFT 166, and pole 168. For clarity, coils, shields, and other portions of the EAMR transducer 160 are not shown. In alternate embodiments, the NFT 166 may be omitted. The grating(s) 162 couple energy from the prism 184 to the waveguide 164. The waveguide 164 directs energy from the grating(s) 162 toward the ABS. The waveguide 164 has a tapered portion 167 and a bending portion 165. The tapered portion 167 allows the energy from the laser 170 to be focused to a smaller spot size. The bending portion 165 allows for a change in direction of the light coupled into the grating 162. In the embodiment shown, the bending portion 165 redirects the energy through an angle of at least eighty and not more than one hundred degrees. In some such embodiments, the light is bent by approximately ninety degrees. In addition, it is noted that the polarization of the energy provided at the NFT 166 is expected to be substantially parallel to the ABS.

The EAMR disk drive 150 functions in a manner analogous to the EAMR disk drives 100/100'. Thus, the EAMR disk drive 150 may share the benefits of the EAMR disk drives 100/100'. Optical coupling efficiency may be improved, for example through the use of the ball lens 182 that collimates the energy from the laser 170 and the grating 162. The components 170, 182, and 184 may be coupled to the slider 152 using wafer level processes. For example, the laser 170 might be aligned using alignment marks. In some embodiments, a die including multiple lasers 170 may be coupled to a substrate including multiple sliders 152 at a wafer level. The edges of the laser 170 may then defined by etching. In either case, alignment accuracy and manufacturing yield may be improved. The ball lens 182 may be aligned simply by affixing the lens 182 in an appropriately sized and positioned recess. In addition, a ball lens 182 or a cylindrical lens may tolerate a greater degree of misalignment without adversely affecting their performance. Further, the ball lens 182 and prism 184 are readily available optical components. The ball lens 182 and prism 184 may thus be pre-screened to ensure that they meet the desired tolerances. Manufacturing yield may thus be enhanced. In addition, the waveguide 164 redirects energy toward the ABS, focuses the energy for the NFT 166, and provides a polarization in the plane of the ABS for the NFT 166. As a result, the performance and fabrication of the EAMR disk drive 150 may be facilitated.

FIG. 5 depicts a trailing face and side views of another exemplary embodiment of a portion of an EAMR disk drive 150'. In particular, trailing face and side views of the slider 152' and some components coupled to the slider are shown. For clarity, FIG. 5 is not to scale. For simplicity not all portions of the EAMR disk drive 150' are shown. In addition, although the disk drive 150' is depicted in the context of particular components other and/or different components may be used. Further, the arrangement of components may vary in different embodiments. The EAMR disk drive 150' is analogous to the EAMR disk drive 150 depicted in FIG. 4. Thus, the EAMR disk drive 150' shown in FIG. 5 may be used in the EAMR disk drives 100 and 100'. Further, the EAMR disk drive 150' includes media (not shown), suspension (not shown), a slider 152', bond pads 156', an EAMR transducer 160', laser 170', and optics 180' that correspond to the slider 152, bond pads 156, the EAMR transducer 160, the laser 170, and the optics 180, respectively. In the trailing face view, the laser diode 170' is shown by dashed lines. For simplicity, the optics 180' are not shown in the trailing face view. The optics 180' includes a lens 182' and prism 184' having a reflective surface corresponding to the lens 182 and the prism 184, respectively. Similarly, the EAMR transducer 160' includes a grating 162', a waveguide 164', NFT 166', and pole 168' that are analogous to the grating 162, waveguide 164, NFT 166, and pole 168, respectively.

The EAMR disk drive 150' has components that are analogous to and may operate in substantially the same manner as the EAMR disk drive 150. However, the EAMR transducer 160' differs from the EAMR transducer 160. More specifically, the waveguide 164' includes not only the tapered portion 167' and bending portion 165', but also the bend 169. The waveguide 164' not only focuses the energy, but also redirects the energy. In the embodiment shown, the bending portions 165' and 166 redirect the energy through a total angle of at least one hundred seventy and not more than one hundred ninety degrees. In some embodiments, the light is bent through an angle of approximately one hundred eighty degrees. In some embodiments, the energy is bent around the pole 168'. Further, the polarization of the energy at the NFT 166' is substantially perpendicular to the ABS.

The EAMR disk drive 150' functions in a manner analogous to the EAMR disk drives 150 and 100/100'. Thus, the EAMR disk drive 150' may share the benefits of the EAMR disk drives 150 and 100/100'. For example, manufacturability and optical efficiency of the EAMR disk drive 150' may be improved. Further, flexibility of the EAMR disk drive 150' is enhanced. More specifically, the EAMR disk drive 150' may employ an NFT 166' that utilizes light having a polarization substantially perpendicular to the ABS. The EAMR disk drives 150 and 150' thus provide disk drives having improved optical efficiency and ease of fabrication in combination with disk drives that can provide light polarized substantially parallel or substantially perpendicular to the ABS.

FIG. 6 depicts a trailing face and side views of another exemplary embodiment of a portion of an EAMR disk drive 150". In particular, trailing face and side views of the slider 152" and some components coupled to the slider are shown. For clarity, FIG. 6 is not to scale. For simplicity not all portions of the EAMR disk drive 150" are shown. In addition, although the disk drive 150" is depicted in the context of particular components other and/or different components may be used. Further, the arrangement of components may vary in different embodiments. The EAMR disk drive 150" is analogous to the EAMR disk drives 150 and 150' depicted in FIGS. 4 and 5. Thus, the EAMR disk drive 150" shown in FIG. 6 may be used in the EAMR disk drives 100 and 100'. The EAMR disk drive 150" includes media (not shown), suspension (not shown), a slider 152", bond pads 156", an EAMR transducer 160", laser 170", and optics 180" that correspond to the slider 152/152', bond pads 156/156', the EAMR transducer 160/160', the laser 170/170', and the optics 180/180', respectively. In the trailing face view, the laser diode 170" is shown by dashed lines. For simplicity, the optics 180" are not shown in the trailing face view. The EAMR transducer 160" includes a grating 162", a waveguide 164", NFT 166", and pole 168" that are analogous to the grating 162/162', waveguide 164/164', NFT 166/166', and pole 168/168', respectively. The waveguide 164" is more analogous to the waveguide 164 in that only a tapered portion 167" and one bending portion 165" are provided. The bending portion 165" of the waveguide 164" redirects the energy in the waveguide 164" by an angle of at least eighty and not more than one hundred degrees. In some embodiments, this angle is substantially ninety degrees.

The EAMR disk drive 150" has components that are analogous to and may operate in substantially the same manner as the EAMR disk drives 150 and 150'. However, the optics 180" differ from the optics 180 and 180'. More specifically, the optics 180" includes a concave mirror 180". The concave mirror 180" both collimates and redirects (e.g. reflects) the energy from the laser 170". The concave mirror 180" may provide the functions of both the ball lens 182/182' and the prism 184/184'. Thus, the concave mirror 180" can efficiently couple energy from the laser 170" to the grating 162"

The EAMR disk drive 150" functions in a manner analogous to the EAMR disk drives 150/150' and 100/100'. Thus, the EAMR disk drive 150" may share the benefits of the EAMR disk drives 150/150' and 100/100'. For example, manufacturability and optical efficiency of the EAMR disk drive 150" may be improved. Further, manufacturing may be further simplified by the use of a single optical component, the concave mirror 180", as the optics. Thus, manufacturability may be further enhanced.

Figure 7:
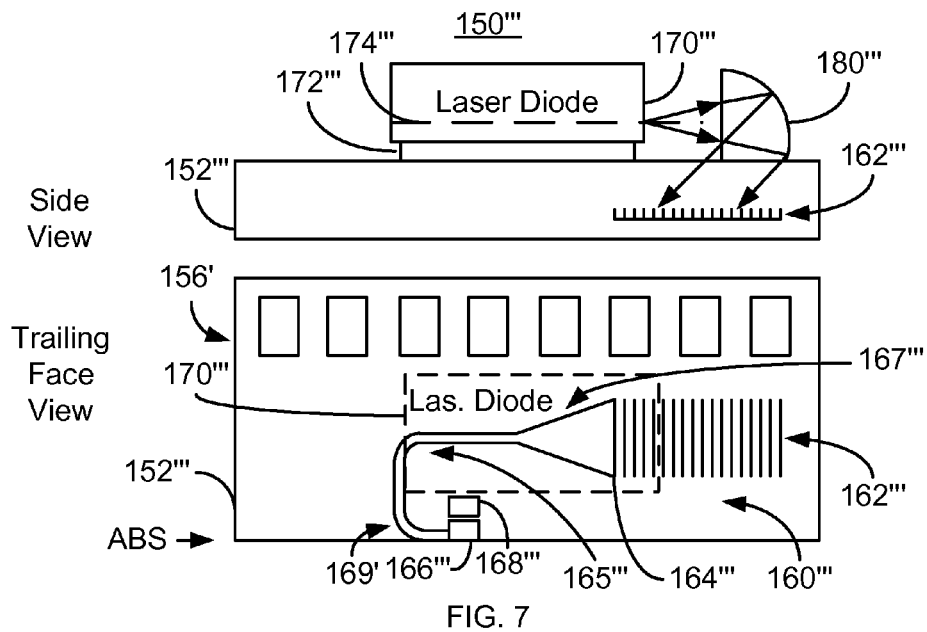
FIG. 7 depicts a trailing face and side views of another exemplary embodiment of a portion of an EAMR disk drive.

FIG. 7 depicts a trailing face and side views of another exemplary embodiment of a portion of an EAMR disk drive 150'''. In particular, trailing face and side views of the slider 152" and some components coupled to the slider are shown. For clarity, FIG. 7 is not to scale. For simplicity not all portions of the EAMR disk drive 150''' are shown. In addition, although the disk drive 150''' is depicted in the context of particular components other and/or different components may be used. Further, the arrangement of components may vary in different embodiments. The EAMR disk drive 150''' is analogous to the EAMR disk drives 150, 150', and 150" depicted in FIGS. 4-6. Thus, the EAMR disk drive 150''' shown in FIG. 7 may be used in the EAMR disk drives 100 and 100'. The EAMR disk drive 150''' includes media (not shown), suspension (not shown), a slider 152''', bond pads 156''', an EAMR transducer 160''', laser 170''', and optics 180''' that correspond to the slider 152/152'/152', bond pads 156/156'/156", the EAMR transducer 160/160'/160", the laser 170/170'/170", and the optics 180/180'/180", respectively. In the trailing face view, the laser diode 170''' is shown by dashed lines, while, the optics 180''' are not shown. The EAMR transducer 160''' includes a grating 162''', a waveguide 164''', NFT 166''', and pole 168''' that are analogous to the grating 162/162'/162", waveguide 164/164'/164", NFT 166/166'/166", and pole 168/168'/168", respectively.

The EAMR disk drive 150''' has components that are analogous to and may operate in substantially the same manner as the EAMR disk drives 150/150'/150". However, portions of the EAMR disk drive 150''' are different. The optics 180''' differ from the optics 180 and 180'. More specifically, the optics 180''' includes a concave mirror 180''". The concave mirror 180''' both collimates and redirects (e.g. reflects) the energy from the laser. In this respect, the EAMR disk drive 150''' is analogous to the EAMR disk drive 150". In addition, the waveguide 164''' is more analogous to the waveguide 164' than to waveguides 164 and 164". In particular, the waveguide 164''' includes two bending portions 165''' and 169' in addition to the tapered portion 167'''. Thus, the waveguide 164" redirects the energy in the waveguide 164''' by an angle of at least one hundred seventy and not more than one hundred ninety degrees. In some embodiments, this angle is substantially one hundred and eighty degrees. Thus, the disk drive 150''' provides to the NFT 166''' energy that is polarized substantially perpendicular to the ABS. In contrast, the disk drive 150" provides to the NFT 166" energy that is polarized substantially parallel to the ABS.

The EAMR disk drive 150''' functions in a manner analogous to the EAMR disk drives 150/150'/150" and 100/100'. Thus, the EAMR disk drive 150''' may share the benefits of the EAMR disk drives 150/150'/150" and 100/100'. For example, manufacturability and optical efficiency of the EAMR disk drive 150' may be improved. Further, manufacturing may be further simplified by the use of a single optical component, the concave mirror 180'''. Flexibility of the EAMR disk drive 150" is enhanced. More specifically, the EAMR disk drive 150" may employ an NFT 166''' that utilizes light having a polarization substantially perpendicular to the ABS. The EAMR disk drives 150' and 150' thus have improved optical efficiency and ease of fabrication in combination with the flexibility to use light polarized substantially parallel or perpendicular to the ABS.

Figure 8:
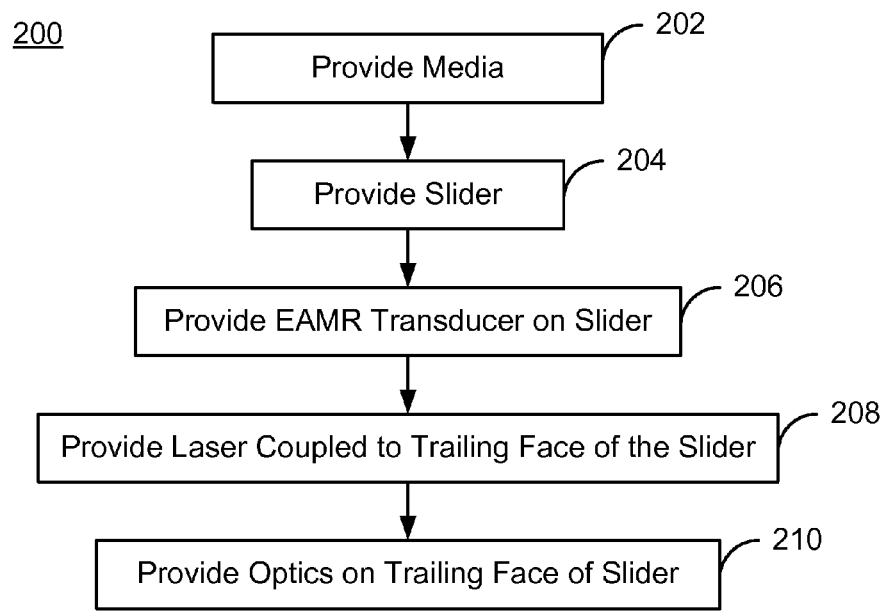
FIG. 8 depicts an exemplary embodiment of a method of forming a portion of an EAMR disk drive.

FIG. 8 depicts an exemplary embodiment of a method 200 of forming a portion of an EAMR disk drive. For simplicity, some steps may be omitted, combined, performed in parallel, performed in another sequence, and/or interleaved. The method 200 is described in the context of the EAMR disk drive 100'. However, the method 200 may be used to fabricate other EAMR disk drives such as the disk drives 150, 150', 150", and 150'''. In addition, the method 200 is described in the context of fabricating a single disk drive 100'. However, multiple transducers, sliders, and multiple disk drives may be fabricated substantially in parallel.

The media 102 for the disk drive is provided, via step 202. The media is used in storing data and is written to using the EAMR transducer 110'. The slider having a back side, a trailing face, and an ABS opposite to the back side is provided, via step 204. The EAMR transducer(s) 110' are provided, via step 206. The EAMR transducer 110' is thus coupled with the slider. A portion of the EAMR transducer 110' is in proximity to the ABS. In some embodiments, step 206 includes deposition and patterning of various layers to form the structures of the EAMR transducer 110' on the slider 106'. Thus, structures such as the waveguide 114, and grating 112' are formed. In addition, NFT 166/166'/166"/166''' and poles 168/168'/168"/168''' are formed. Formation of the waveguide 114 may include formation of any of the waveguides 164/164'/164"/164'''. Thus, one or more bends 165/165'/165"/165''' and 169/169' may be formed.

The laser 120' is coupled with the trailing face of the slider, via step 208. Thus, the laser 120' is placed at a particular location of the slider 106'. Using bond pads 122, the laser 120' is bonded to the trailing face of the slider 152'. In some embodiments, step 208 includes fabricating the laser 120'. For example, if multiple lasers are bonded to the slider 106' in step 208, then step 208 may include separating the individual lasers after bonding, for example by etching the die to expose the edges of the lasers 120'.

Optics 130' coupled with the trailing face of the slider 106' are also provided, via step 210. Step 210 might include inspecting any optical components used, aligning the components to the extent desired, and fixing the optical components in place. In addition, step 210 may include aligning and attaching a bar including multiple optical components, then separating the individual optical components corresponding to each slider. Thus, using the method 200, the disk drive 100' may be manufactured. As such, the benefits of the disk drive 100' may be achieved.

Figure 9:
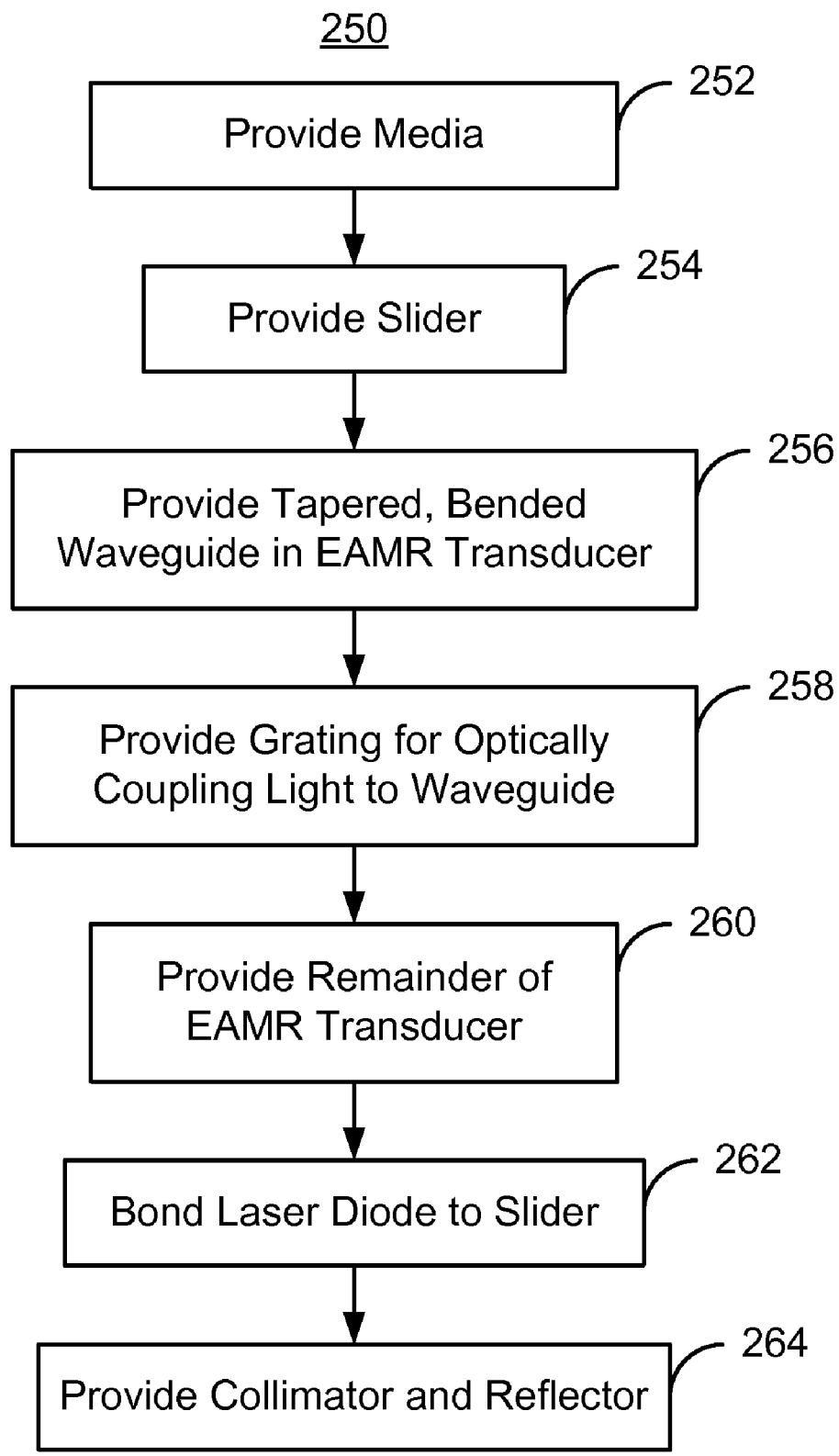
FIG. 9 depicts another exemplary embodiment of a method of forming a portion of an EAMR disk drive.

FIG. 9 depicts an exemplary embodiment of a method 250 of forming a portion of an EAMR disk drive. For simplicity, some steps may be omitted, combined, performed in parallel, performed in another sequence, and/or interleaved. The method 250 is described in the context of the EAMR disk drives 150/150'/150"/150"'. However, the method 250 may be used to fabricate other EAMR disk drives. In addition, the method 250 is described in the context of fabricating a single disk drive 150/150'/150"/150"'. However, multiple transducers, sliders, and multiple disk drives may be fabricated substantially in parallel.

The media for the disk drive 150/150'/150"/150"' is provided, via step 252. The media is used in storing data and is written to using the EAMR transducer 160/160'/160"/160"'. The slider 152/152'/152"/152"' having a back side, a trailing face, and an ABS opposite to the back side is provided, via step 254.

A waveguide 164/164'/164"/164"' is provided, via step 256. The waveguide 164/164'/164"/164"' fabricated in step 256 may thus be tapered and have at least one bend 165/165' and 169/165"/165"' and 169'. The grating 162/162'/162"/162"' is also provided, via step 258. The remaining portions of the EAMR transducers 160/160'/160"/160"' are provided, via step 260.

The laser 170/170'/170"/170"' is bonded to the trailing face of the slider, via step 262. Thus, the laser 120' is placed at a particular location of the slider 152/152'/152"/152"' and bonded using bond pads 172/172'/172"/172"'. In some embodiments, step 262 includes fabricating the laser 170/170'/170"/170"'. For example, if multiple lasers are bonded to the slider 152/152'/152"/152"' in step 262, then step 262 may include separating the individual lasers 170/170'/170"/170"' after bonding. For example the die including multiple lasers 170/170'/170"/170"' may be etched to separate and expose the edges of the lasers 170/170'/170"/170"'.

Optics 180/180'/180"/180"' are coupled with the trailing face of the slider 152/152'/152"/152"', via step 264. Thus, a collimator and a reflector are provided in step 264. In some embodiments, step 264 includes providing the ball lens 182/182' and the prism 184/184'. In other embodiments, step 264 may include providing the concave mirror 180"/180"'. Step 264 might include inspecting any optical components used, aligning the components to the extent desired, and fixing the optical components in place. In addition, step 264 may include aligning and attaching a bar including multiple optical components, then separating the individual optical components corresponding to each slider. Thus, using the method 250, the disk drives 150/150'/150"/150" may be manufactured. The benefits of the disk drive 150/150'/150"/150"' may thus be achieved.

We claim:

1. An energy assisted magnetic recording (EAMR) disk drive comprising:
a media for storing data;
a slider having a back side, a trailing face, and an air-bearing surface (ABS) opposite the back side;
at least one laser coupled with the trailing face of the slider, each of the at least one laser having an optic axis substantially parallel to the trailing face of the slider, the at least one laser providing energy substantially along the optic axis;
optics coupled with the trailing face of the slider, the optics receiving the energy from the at least one laser via free space;
at least one EAMR transducer coupled with the slider, and at least a portion of the transducer residing in proximity to the ABS, the optics for directing the energy from the at least one laser to the at least one EAMR transducer, the at least one EAMR transducer receiving the energy from the optics and writing to the media using the energy, wherein the at least one EAMR transducer further includes
at least one waveguide optically coupled with the optics and including at least one tapered portion for focusing the energy, the at least one tapered portion including a waveguide optic axis substantially parallel to the trailing face of the slider, wherein the at least one waveguide further includes
at least one bending portion optically coupled with the at least one tapered portion, the bending portion for redirecting the energy by at least one hundred seventy and not more than one hundred ninety degrees.

2. The EAMR disk drive of claim 1 wherein the optics further includes:
a collimator for focusing the energy from the laser; and
a reflective surface for receiving the energy from the collimator and redirecting the energy toward the EAMR transducer.

3. The EAMR disk drive of claim 2 wherein the optics further includes:
a ball lens mounted on the slider for collimating the energy from the laser.

4. The EAMR transducer of claim 3 wherein the optics include:
a microprism including the reflective surface.

5. An energy assisted magnetic recording (EAMR) disk drive comprising:
a media for storing data;
a slider having a back side, a trailing face, and an air-bearing surface (ABS) opposite the back side;
at least one laser coupled with the trailing face of the slider, each of the at least one laser having an optic axis substantially parallel to the trailing face of the slider, the at least one laser providing energy substantially along the optic axis;
optics coupled with the trailing face of the slider, the optics receiving the energy from the at least one laser via free space, wherein the optics further include
a concave mirror for receiving the energy from the laser, collimating the energy, and redirecting the energy toward the EAMR transducer; and
at least one EAMR transducer coupled with the slider, and at least a portion of the transducer residing in proximity to the ABS, the optics for directing the energy from the at least one laser to the at least one EAMR transducer, the at least one EAMR transducer receiving the energy from the optics and writing to the media using the energy.

6. The EAMR disk drive of claim 5 wherein the at least one EAMR transducer further includes:
at least one waveguide optically coupled with the optics and including at least one tapered portion for focusing the energy, the at least one tapered portion including a waveguide optic axis substantially parallel to the trailing face of the slider.

7. The EAMR disk drive of claim 6 wherein the at least one waveguide includes at least one bending portion optically coupled with and separated from the at least one tapered portion.

8. The EAMR disk drive of claim 6 wherein the at least one waveguide further includes:
- at least one bending portion optically coupled with the at least one tapered portion, the bending portion for redirecting the energy by at least eighty and not more than one hundred degrees.

9. The EAMR disk drive of claim 5 wherein the at least one transducer further includes:
- a grating coupled with the slider, the optics directing energy from the laser to the grating, the grating having a grating optic axis substantially parallel to the trailing face of the slider;
- at least one waveguide optically coupled with the at least one grating;
- at least one near-field transducer optically coupled with the at least one waveguide, the at least one near-field transducer for heating a region of a recording media; and
- at least one magnetic recording pole configured to provide a write field in the region of the magnetic recording media during heating.

10. The EAMR disk drive of claim 9 wherein the at least one waveguide includes at least one tapered, bended waveguide for redirecting the energy by substantially ninety degrees.

11. An energy assisted magnetic recording (EAMR) disk drive comprising:
- a media for storing data;
- a slider having a back side, a trailing face, and an air-bearing surface (ABS) opposite the back side;
- at least one laser coupled with the trailing face of the slider, each of the at least one laser having an optic axis substantially parallel to the trailing face of the slider, the at least one laser providing energy substantially along the optic axis;
- optics coupled with the trailing face of the slider, the optics receiving the energy from the at least one laser via free space;
- at least one EAMR transducer coupled with the slider, and at least a portion of the transducer residing in proximity to the ABS, the optics for directing the energy from the at least one laser to the at least one EAMR transducer, the at least one EAMR transducer receiving the energy from the optics and writing to the media using the energy;
- wherein the at least one EAMR transducer includes a grating coupled with the slider, the optics directing energy from the laser to the grating, the grating having a grating optic axis substantially parallel to the trailing face of the slider;
- at least one waveguide optically coupled with the at least one grating;
- at least one near-field transducer optically coupled with the at least one waveguide, the at least one near-field transducer for heating a region of a recording media; and
- at least one magnetic recording pole configured to provide a write field in the region of the magnetic recording media during heating
- wherein the at least one waveguide includes at least one tapered bended waveguide for redirecting the energy by substantially one hundred eighty degrees.

12. An energy assisted magnetic recording (EAMR) disk drive comprising:
- a media for storing data;
- a slider having a back side, a trailing face, and an air-bearing surface (ABS) opposite the back side;
- at least one laser coupled with the trailing face of the slider, each of the at least one laser having an optic axis substantially parallel to the trailing face of the slider, the laser providing energy substantially along the optic axis;
- optics coupled with the trailing face of the slider, the optics including at least one of a ball lens optically coupled with a microprism and a concave mirror, the optics being optically coupled with the at least one laser via free space; and
- at least one EAMR transducer coupled with the slider, at least a portion of the at least one EAMR transducer residing in proximity to the ABS, the optics for directing the energy from the at least one laser to the at least one EAMR transducer, the at least one EAMR transducer receiving the energy from the optics and writing to the media using the energy, the at least one EAMR transducer further including;
- a grating coupled with the slider, the optics directing energy from the laser to the grating, the grating having a grating optic axis substantially parallel to the trailing face of the slider;
- at least one waveguide optically coupled with the at least one grating and including at least one tapered portion and at least one bending portion, the at least one tapered portion having a waveguide optic axis substantially parallel to the trailing face of the slider, the at least one bending portion for redirecting the energy by at least one hundred seventy and not more than one hundred ninety degrees;
- at least one near-field transducer optically coupled with the at least one waveguide, the at least one near-field transducer for heating a region of a recording media; and
- at least one magnetic recording pole configured to provide a write field in the region of the magnetic recording media during heating.

13. A method for providing an energy assisted magnetic recording (EAMR) disk drive comprising:
- providing a media for storing data;
- providing a slider having a back side, a trailing face, and an air-bearing surface (ABS) opposite to the back side;
- providing at least one laser coupled with the trailing face of the slider, each of the at least one laser having an optic axis substantially parallel to the trailing face of the slider, the laser providing energy substantially along the optic axis;
- providing optics coupled with the trailing face of the slider, the optics receiving the energy from the at least one laser via free space;
- providing at least one EAMR transducer coupled with the slider, a portion of the EAMR transducer being in proximity to the ABS, the optics for directing the energy from the at least one laser to the at least one EAMR transducer, the at least one EAMR transducer receiving the energy from the optics and writing to the media using the energy; wherein the step of providing the at least one EAMR transducer further includes
- providing at least one waveguide optically coupled with the optics and including at least one tapered portion for focusing the energy, the at least one tapered portion including a waveguide optic axis substantially parallel to the trailing face of the slider, wherein the at least one waveguide further includes at least one bending portion optically coupled with the at least one tapered portion, the bending portion for redirecting the energy by at least one hundred seventy and not more than one hundred ninety degrees.

14. The method of claim 13 wherein the step of providing the at least one laser further includes;

wafer bonding the at least one laser to the trailing face of the slider.

15. The method of claim 13 wherein the step of providing the optics further includes:
providing a collimator for focusing the energy from the laser; and
providing a reflective surface for receiving the energy from the collimator and redirecting the energy toward the EAMR transducer.

16. The method of claim 15 wherein the step of providing the optics further includes:
providing a ball lens mounted on the slider for collimating the energy from the laser.

17. The method of claim 16 wherein the step of providing the optics further includes:
providing a microprism including the reflective surface.

18. A method for providing an energy assisted magnetic recording (EAMR) disk drive comprising:
providing a media for storing data;
providing a slider having a back side, a trailing face, and an air-bearing surface (ABS) opposite to the back side;
providing at least one laser coupled with the trailing face of the slider, each of the at least one laser having an optic axis substantially parallel to the trailing face of the slider, the laser providing energy substantially along the optic axis;
providing optics coupled with the trailing face of the slider, the optics receiving the energy from the at least one laser via free space
wherein the step of providing the optics further includes
providing a concave mirror for receiving the energy from the laser, collimating the energy, and redirecting the energy toward the EAMR transducer; and
providing at least one EAMR transducer coupled with the slider, a portion of the EAMR transducer being in proximity to the ABS, the optics for directing the energy from the at least one laser to the at least one EAMR transducer, the at least one EAMR transducer receiving the energy from the optics and writing to the media using the energy.

19. The method of claim 18 wherein the step of providing the at least one EAMR transducer further includes:
providing at least one waveguide optically coupled with the optics and including at least one tapered portion for focusing the energy, the at least one tapered portion including a waveguide optic axis substantially parallel to the trailing face of the slider.

20. The method of claim 19 wherein the at least one waveguide includes at least one bending portion optically coupled with and separated from the at least one tapered portion.

21. The method of claim 19 wherein the at least one waveguide further includes:
at least one bending portion optically coupled with the at least one tapered portion, the bending portion for redirecting the energy by at least eighty and not more than one hundred degrees.

22. The method of claim 18 wherein the step of providing the at least one transducer further includes:
providing a grating coupled with the slider, the optics directing energy from the laser to the grating, the grating having a grating optic axis substantially parallel to the trailing face of the slider;
providing at least one waveguide optically coupled with the at least one grating;
providing at least one near-field transducer optically coupled with the at least one waveguide, the at least one near-field transducer for heating a region of a recording media; and
providing at least one magnetic recording pole configured to provide a write field in the region of the magnetic recording media during heating.

23. The method of claim 22 wherein the at least one waveguide includes at least one tapered, bended waveguide for redirecting the energy by substantially ninety degrees.

24. A method for providing an energy assisted magnetic recording (EAMR) disk drive comprising:
providing a media for storing data;
providing a slider having a back side, a trailing face, and an air-bearing surface (ABS) opposite to the back side;
providing at least one laser coupled with the trailing face of the slider, each of the at least one laser having an optic axis substantially parallel to the trailing face of the slider, the laser providing energy substantially along the optic axis;
providing optics coupled with the trailing face of the slider, the optics receiving the energy from the at least one laser via free space; and
providing at least one EAMR transducer coupled with the slider, a portion of the EAMR transducer being in proximity to the ABS, the optics for directing the energy from the at least one laser to the at least one EAMR transducer, the at least one EAMR transducer receiving the energy from the optics and writing to the media using the energy, the step of providing the at least one EAMR transducer further including
providing a grating coupled with the slider, the optics directing energy from the laser to the grating, the grating having a grating optic axis substantially parallel to the trailing face of the slider;
providing at least one waveguide optically coupled with the at least one grating;
providing at least one near-field transducer optically coupled with the at least one waveguide, the at least one near-field transducer for heating a region of a recording media; and
providing at least one magnetic recording pole configured to provide a write field in the region of the magnetic recording media during heating, and
wherein the at least one waveguide includes at least one tapered bended waveguide for redirecting the energy by substantially one hundred eighty degrees.

* * * * *